US012601718B2

(12) United States Patent
Li et al.

(10) Patent No.: US 12,601,718 B2
(45) Date of Patent: Apr. 14, 2026

(54) METHOD FOR PRETREATING RANITIDINE HYDROCHLORIDE SAMPLE

(71) Applicant: Hunan Institute for Drug Inspection and Testing, Changsha City (CN)

(72) Inventors: Shuai Li, Changsha City (CN); Bin Liao, Changsha City (CN); Hongyu Chen, Changsha City (CN); Yuxin Li, Changsha City (CN); Yanming Liu, Changsha City (CN); Guipeng Tang, Changsha City (CN); Yang Gao, Changsha City (CN)

(73) Assignee: Hunan Institute for Drug Inspection and Testing, Changsha City (CN)

( * ) Notice: Subject to any disclaimer, the term of this patent is extended or adjusted under 35 U.S.C. 154(b) by 486 days.

(21) Appl. No.: 18/138,316

(22) Filed: Apr. 24, 2023

(65) Prior Publication Data

US 2023/0349865 A1 Nov. 2, 2023

(30) Foreign Application Priority Data

Apr. 27, 2022 (CN) .......................... 202210453076.4

(51) Int. Cl.
*G01N 30/06* (2006.01)
*G01N 1/40* (2006.01)
(Continued)

(52) U.S. Cl.
CPC ........... *G01N 30/06* (2013.01); *G01N 1/4077* (2013.01); *G01N 30/7233* (2013.01);
(Continued)

(58) Field of Classification Search
CPC ........ B01D 15/08; G01N 30/04; G01N 30/06; G01N 1/4077; G01N 2001/4088; G01N 2030/067
See application file for complete search history.

(56) References Cited

FOREIGN PATENT DOCUMENTS

CN 112526005 A 3/2021

OTHER PUBLICATIONS

"Notice on Carrying out the Inspection of N-nitrosodimethylamine in Ranitidine" Zhongjian Huayaohan [2019] No. 710, Letters [2019] No. 710, Institute for Chemical Drug Control, NIFDC, 13 pages.

(Continued)

*Primary Examiner* — Benjamin M Kurtz
(74) *Attorney, Agent, or Firm* — Casimir Jones, S.C.; Robert A. Goetz

(57) ABSTRACT

Disclosed is a method for pretreating Ranitidine hydrochloride sample, comprising steps: S1, weighing the Ranitidine hydrochloride sample containing an impurity of N-nitrosodimethylamine; S2, preparing a test solution of Ranitidine hydrochloride so that the concentration of N-nitrosodimethylamine in the test solution reaches the detection limit of high-performance liquid chromatography; S3, adding an alkaline solution to the Ranitidine hydrochloride test solution, wherein the alkaline solution reacts completely with hydrochloric acid in Ranitidine hydrochloride to give a Ranitidine neutralizing solution; S4, adding a silver ion solution to the Ranitidine neutralizing solution, and silver ions undergo a complete complexation reaction with secondary amino groups in Ranitidine to generate a precipitate. The precipitation of Ranitidine in the high-concentration Ranitidine test article is removed without producing NDMA as a by-product while retaining NDMA in the sample, greatly improving the sensitivity of NDMA detection and meeting the detection requirements of various types of mass spectrometry.

20 Claims, 12 Drawing Sheets

(51) Int. Cl.
     *G01N 30/02*        (2006.01)
     *G01N 30/72*        (2006.01)

(52) U.S. Cl.
     CPC ................ *G01N 2001/4088* (2013.01); *G01N*
                *2030/027* (2013.01); *G01N 2030/067*
                              (2013.01)

(56)              References Cited

OTHER PUBLICATIONS

"Chinese Pharmacopoeia" 2020 Edition IV 9306 Guiding Principles for the Control of Genotoxic Impurities, 8 pages.

METHOD FOR PRETREATING RANITIDINE HYDROCHLORIDE SAMPLE

CROSS-REFERENCE TO RELATED APPLICATION

This patent application claims the benefit and priority of Chinese Patent Application No. 202210453076.4 filed with the China National Intellectual Property Administration on Apr. 27, 2022, the disclosure of which is incorporated by reference herein in its entirety as part of the present application.

TECHNICAL FIELD

The present disclosure relates to the processing of a Ranitidine hydrochloride sample, in particular to a method for pretreating a Ranitidine hydrochloride sample.

BACKGROUND

N-nitrosodimethylamine (NDMA) has strong genotoxicity, strong teratogenicity, and strong carcinogenicity, and belongs to a class-2A carcinogen. According to the toxicological data in the FDA according to the Carcinogenic Potency Database (CPDB database), the NDMA acceptable daily intake is set at about 0.096 μg. On Sep. 13, 2019, the FDA released a safety warning that some Ranitidine-based drugs (including the brand-name drug Zantac) contain the impurity of N-nitrosodimethylamine (NDMA). Subsequently, China launched special inspections and testing on NDMA for this variety.

According to Section 9306 genotoxicity impurity control guidelines, part four of the *Chinese Pharmacopoeia* (2020 edition), the NDMA content in Ranitidine hydrochloride capsules can be derived based on the method of compound-specific risk assessment to derive the acceptable intake, that is, using a linear extrapolation method to calculate compound-specific acceptable intake, based on the dose that causes 50% tumor incidence (Median Toxic Dose, half toxic dose, TD50) In the TD50 linear extrapolation method, the impurity acceptable intake is calculated via the rodent carcinogenicity data, and the limit value of the impurity NDMA is 0.0959 μg/(kg·d)÷300 mg≈320 ng/g.

The existing domestic inspection technology is included in "Notice on Carrying out the Inspection of N-nitrosodimethylamine in Ranitidine" (Zhongjian Huayaohan [2019] No. 710, Letters [2019] No. 710, Institute for Chemical Drug Control, NIFDC)" as Appendix 2: "Determination of N-nitrosodimethylamine in Ranitidine hydrochloride ingredient capsules and tablets by HPLC-MS/MS". In that method, the content of N-nitrosodimethylamine is determined by an HPLC-MS method. The test article is prepared as follows: taking an appropriate amount (approximately equivalent to 300 mg of Ranitidine) of the content product into a suitable container, adding precisely 10 ml of methanol, vortexing and mixing for 1 minute, and then shaking for 40 minutes, centrifuging, filtering the supernatant, collecting the subsequent filtrate to obtain the test solution. The limit of quantification of NDMA in Ranitidine is about 33 ppb as determined by the prior art method.

The existing testing techniques in the EU and the FDA are HPLC-MS and GC-MS. In the National Agency for the Safety of Medicines and Health Products, the HPLC method is used. However, the detection limit of this method is 8.5 ng/ml, which cannot meet the requirement for the acceptable limit of NDMA and is only used for primary screening.

Through comparative tests among the instruments, the existing method has higher requirements for HPLC-MS instruments. Some old-model instruments can only reach the limit of quantification of a concentration of 2 ng/ml NDMA, and only few newer and well-maintained instruments meet the requirement of the quantification limit of 1 ng/ml. Therefore, it is necessary to develop a method to improve durability so that measurement requirements can be satisfied in most instruments.

When assay was performed according to the HPLC section in the existing method "Determination of N-nitrosodimethylamine in Ranitidine hydrochloride ingredient capsules and tablets by HPLC-MS/MS", the chromatographic column was seriously overloaded (the concentration of the test solution is 30 mg/ml), and the requirement for NDMA detection limit could be met. If the requirement of NDMA detection limits needs to be met, the concentration of the test solution needs to be increased by about 8 times (the concentration of the test solution is about 250 mg/ml). At this concentration of the test solution, the solution became a light yellow viscous liquid. To protect the chromatographic system, the concentration of the solution was not directly measured.

In view of the technical problem to be solved, the present disclosure provides a method for pretreating Ranitidine sample, which allows for accurately detecting the content of N-nitrosodimethylamine by using high-performance liquid chromatography.

In order to solve the above-mentioned technical problem, the present disclosure provides a pretreatment method for Ranitidine hydrochloride sample, comprising the following steps:

step S1: weighing a Ranitidine hydrochloride sample containing an impurity of N-nitrosodimethylamine;

step S2: preparing a Ranitidine hydrochloride test solution, with a concentration of N-nitrosodimethylamine in the Ranitidine hydrochloride test solution higher than a detection limit of high-performance liquid chromatography;

step S3: adding an alkaline solution to the Ranitidine hydrochloride test solution to allow the alkaline solution to react completely with chloride ions in Ranitidine hydrochloride to obtain a Ranitidine neutralizing solution;

step S4: adding a silver ion solution to the Ranitidine neutralizing solution to obtain a reaction solution; wherein silver ions in the reaction solution undergo a complexation reaction with a secondary amino group in the Ranitidine completely to generate a precipitate;

step S5: filtering a resulting reaction solution formed in S4 to obtain filtrate as a processed test solution.

When the concentration of N-nitrosodimethylamine in the Ranitidine hydrochloride test solution is higher than the detection limit of the high-performance liquid chromatography, the concentration of Ranitidine hydrochloride in the Ranitidine hydrochloride test solution exceeds the load capacity of the liquid chromatography. In the present disclosure, the alkaline solution is added to neutralize chlorine ions in Ranitidine hydrochloride, and silver ions are added to completely undergo a complexation reaction with a secondary amino group in Ranitidine. By combing these two technical means, most of Ranitidine is precipitated, thereby reducing the concentration of Ranitidine in the test solution, so that the concentration of Ranitidine in the test solution does not exceed the load capacity of the liquid chromatography.

Furthermore, in step S3, the molar ratio between the Ranitidine hydrochloride test solution and the alkaline solution is 1:1-1.05.

The alkaline solution can be added in such an amount that it exactly neutralizes the chloride ions in Ranitidine hydrochloride, or it can be slightly excessive. More preferably, the alkaline solution is slightly excessive, and the molar ratio of the Ranitidine hydrochloride test solution to the alkaline solution is 1:1-1.05 to make the solution alkaline, so that NDMA has good water solubility, is more stable in alkaline solution, does not reacting with other added reagents, and is better separated from Ranitidine through precipitation.

Furthermore, in step S4, a molar ratio of the Ranitidine neutralizing solution and the silver ion solution is 1:2-2.1.

The silver ion solution may be in an amount that it exactly reacts with the secondary amino group in Ranitidine, or it may be slightly excessive.

Furthermore, if the filtrate in step S5 is turbid, the filtrate can be frozen at −25 to −15° C. for 5 to 20 minutes, then centrifuged and filtered to give the processed test solution. Low-temperature freezing can make the precipitation more complete and make the filtration more thorough.

Furthermore, in step S4, if too much silver ion solution is added, is preferred to add a chloride ion solution to the reaction solution after the precipitation occurs in S4 to react with excess silver ion to form a precipitate.

Further, the molar ratio of the chloride ion solution to the silver ion solution is (0.5-0.6):(2-2.1).

The chloride ions introduced by sodium chloride can further react with slightly excess silver ions to protect the chromatographic column and MS detector.

Furthermore, the alkaline solution is selected from the group consisting of sodium hydroxide aqueous solution, potassium hydroxide aqueous solution, sodium carbonate aqueous solution, sodium bicarbonate aqueous solution, and ammonia. More preferably, since weak base solution has limited neutralization ability and has little effect on the precipitation, sodium hydroxide among the strong bases is economically available, thus the sodium hydroxide aqueous solution is the alkaline solution.

Further, the silver ion solution is a silver nitrate solution.

Further, the Ranitidine hydrochloride test solution is an aqueous solution of the Ranitidine hydrochloride test article.

In the Ranitidine hydrochloride test solution, water is used as the solvent, which avoids the use of dichloromethane as a solvent and additional drying operation of the Ranitidine hydrochloride sample and can avoid the formation of by-product of NDMA from the Ranitidine hydrochloride sample during the drying process, which affects the accuracy of the testing.

Furthermore, when the injection volume of high-performance liquid chromatography is 20 μL, the limit of quantification of N-nitrosodimethylamine in the Ranitidine hydrochloride test solution can reach up to 32 ppb. When high-performance liquid chromatography is used, the concentration of N-nitrosodimethylamine reaches the detection limit.

According to the existing domestic inspection technology in "Appendix 2: Determination of N in Ranitidine hydrochloride raw material capsules and tablets by HPLC-MS/MS-Nitrosodimethylamine" in the Notice on Carrying out the Inspection of N-nitrosodimethylamine in Ranitidine (Zhongjian Huayaohan [2019] No. 710)", when a test solution concentration of 30 mg/ml is used in this method, and an overload trend of flat-head peaks appear in the chromatographic peaks, indicating that the upper limit of the concentration of the Ranitidine hydrochloride test solution is about 30 mg/ml.

The patent publication CN112526005A discloses a high-performance liquid chromatography analysis method for nitrosamines in Ranitidine drugs, including the following steps: (1) sample processing; (2) preparation of sample solution; (3) preparation of control solution; and (4) chromatographic analysis. The patent publication adopted the HPLC method to determine NDMA, in which Ranitidine-based drugs were subjected to drying, grinding, and preparation under sealed and low-temperature conditions, and setup of process conditions for filtering before testing.

The patent publication CN112526005A has certain defects and cannot meet the measurement requirements, which are as follows:

Comparative experiments showed that NDMA transfer was not sufficient. Samples of the same batch were comparatively tested by using the method in patent publication CN112526005A and the method in the present disclosure. The results showed that the detection amount of NDMA by using the method in patent publication CN112526005A was only about 50% of that by using the method in the present disclosure (the sample was the active pharmaceutical ingredient having moisture content lower than 0.1%, which was subjected to drying treatment). It was speculated that the reason may be that Ranitidine is hardly soluble in dichloromethane after treating the test article using the method in patent publication CN112526005A, and NDMA trapped in the crystal lattice cannot be dissolved, leading to a decrease in the detection amount. In the recovery test, added NDMA was in a non-trapped state, therefore the recovery reported in this patent publication was relatively high.

The drying process can lead to the degradation of Ranitidine to produce NDMA. The preliminary test of the present disclosure showed that in the test of high-temperature influence factor for the Ranitidine hydrochloride capsules at 80° C., the NDMA content could increase from 0.2 ppm to about 300 ppm after 24 hours, and the NDMA generation amount per hour was about 12.5 ppm, and the NDMA generated per hour had exceeded the limit of 0.3 ppm. Therefore, drying treatment will seriously interfere with the measurement results.

Moisture content has a great influence on the measurement results. Both Ranitidine and NDMA are readily soluble in water and almost insoluble in dichloromethane. If dichloromethane is used as a solvent to extract NDMA from Ranitidine, the test article needs to be kept dry, otherwise, NDMA cannot be partitioned from water to dichloromethane, which is why drying treatment is emphasized in that patent publication. Due to the strong hygroscopicity of Ranitidine hydrochloride, tests have shown that reduced-pressure drying or silica-gel drying at normal temperature cannot control the moisture to a relatively low level within 24 hours, and although a high-temperature condition allows for quickly reducing moisture, the drying process will cause degradation of Ranitidine and generation of NDMA.

Poor repeatability. Because all the factors such as the factor of extraction with dichloromethane, drying factor, and moisture content have a greater influence on the determination result, the determination result was variable when samples of the same batch were treated according to the method in patent publication CN112526005A, and the repeatability was poor.

Dichloromethane as a solvent causes greater extension of chromatographic peaks. In the chromatographic conditions of the patent publication CN112526005A, the mobile phase gradient was changed from 100% water phase A to 0% within 0-15 min, NDMA peaks appeared at about 4 min, at which time the ratio of water phase to organic phase was 90:10, which was not enough to elute dichloromethane. NDMA in dichloromethane needed to go through a two-phase partition process to be gradually released into the mobile phase and eluted the peak, resulting in a larger extension of the chromatographic peaks and a decrease in sensitivity.

The present disclosure discloses a sample pretreatment method used in the determination of N-nitrosodimethylamine (NDMA) in Ranitidine and its solid preparations.

NDMA is a toxic impurity having strong carcinogenicity contained in Ranitidine and its preparations. Its acceptable limits are extremely low, and only 300 ng of NDMA is allowed per g of Ranitidine. Due to the low limit of NDMA, mass spectrometry with high sensitivity is generally used for detection according to the prior art, and the limit of quantification is about 33 ppb. Although mass spectrometry has high sensitivity, the instrument is expensive and relies on importing from foreign countries, and the inspection cost is high. It requires high professional capability of inspectors. As a result, most pharmaceutical companies of Ranitidine and its preparations are not qualified for inspection, which forms a barrier to in-house control of drug quality and hinders the supervision of drug quality.

NDMA can be detected by high-performance liquid chromatography (HPLC method), but because the sensitivity is one order of magnitude lower than that of mass spectrometry, the samples prepared according to the existing treatment method for the test article cannot meet the requirement for quantification. If the concentration or injection volume of the test solution is increased, the content of Ranitidine will seriously exceed the chromatographic column load capacity, and other impurities will interfere with the detection of NDMA.

The present disclosure focuses on the study of the method of sample treatment, using a proper method to remove the Ranitidine precipitate in the high-concentration solution of the Ranitidine test article while retaining NDMA to meet the sensitivity requirements for the HPLC method.

The key technical points of the present disclosure include:

Use of sodium hydroxide to alkalize the test solution to remove the acid radicals of Ranitidine hydrochloride, making Ranitidine easier to precipitate and avoiding the degradation of Ranitidine to form NDMA during the treatment of the test article. Ranitidine hydrochloride is more stably retained in the chromatographic column after removing the acid radicals. After testing, the test article in which acid radicals have not been neutralized will exceed the buffer capacity of the mobile phase, resulting in the separation of ionic Ranitidine and molecular Ranitidine from each other, splitting of the main peak of Ranitidine, and substantial extension.

The Ranitidine secondary amino group is complexed with silver to form a precipitate, and the Ranitidine is removed from the solution by centrifugation and filtration, so that the sampling volume is greatly increased, and the NDMA concentration meets the requirement for quantification.

NDMA does not react with other reagents in the designed method for sample pretreatment and has favored stability.

The present disclosure also discloses the use of a chromatographic column to carry out chromatographic analysis on the treated test solution and the control solution, respectively, and the conditions for high-performance liquid chromatography are as follows:

the wavelength is 235 nm, the flow rate is 1 ml/min, the column temperature is 30° C., and the injection volume is 20 μl;

the mobile phase of high-performance liquid chromatography includes mobile phase A and mobile phase B, mobile phase A is an alkaline aqueous mobile phase, the alkaline aqueous mobile phase satisfies $7 < pH \leq 10.5$, and mobile phase B is an organic phase.

In the present disclosure, basic mobile phase A is used, which satisfies $7 < pH \leq 10.5$. Ranitidine is a basic compound and it is partitioned between the mobile phase and the stationary phase in a molecular state in the basic mobile phase. The retention time is greatly prolonged and the peak shape is preferred. When the pH is lower than 7, there will be double peaks; when the pH is higher than 10.5, the retention time of NDMA will be shortened, and the resolution relative to adjacent chromatographic peaks will be reduced, and it is not friendly to the chromatographic column. Therefore, the pH of the mobile phase should be $7 < pH \leq 10.5$.

Furthermore, the alkaline aqueous mobile phase satisfies $9.5 \leq pH \leq 10.5$. When the pH is lower than pH 9.5, split peaks will occur, thus the pH of the mobile phase pH is better to set at $9.5 \leq pH \leq 10.5$.

Furthermore, the alkaline aqueous mobile phase is an alkaline ammonium bicarbonate solution. The alkaline ammonium bicarbonate solution can produce an ideal pH value and desired buffer capacity, and the baseline noise is low, which meets the requirement for the detection of trace substances. Ammonium bicarbonate is a volatile substance, which is compatible with mass spectrometry and enables convenient verification of mass spectrometry or method transfer of mass spectrometry.

Furthermore, the basic ammonium bicarbonate solution is prepared by adding ammonia to the ammonium bicarbonate solution. Ammonia is a volatile substance, which is compatible with mass spectrometry and enables convenient verification of mass spectrometry or method transfer of mass spectrometry.

Furthermore, during the chromatographic analysis, gradient elution is used, and the gradient elution includes the following stages:

The first stage is the impurity detection interval of nitrosamines, the volume ratio of mobile phase A is 90% to 99%, and the volume ratio of mobile phase B is 1% to 10%;

The second stage is the stage of gradient ramping of the organic phase, the volume ratio of mobile phase A is 90% to 99%, and the volume ratio of mobile phase B is 1% to 10%;

The third stage is the full elution stage, the volume ratio of mobile phase A is 10%-30%, and the volume ratio of mobile phase B is 70%-90%.

Compared with the prior arts, the beneficial effects of the present disclosure are:

The materials are readily available and economical, and the operation is simple. In the present disclosure, Ranitidine is removed through a relatively dedicated precipitation reaction, and the reagents used are all common. The preparation process for the test solution is relatively simple and quick, and the average processing time of each batch of the test article is within half an hour, which does not involve complicated operations such as extraction, reflux, enrichment, etc.

The present disclosure provides a feasible sample pretreatment method to greatly increase the sampling volume, making it possible to determine NDMA by an HPLC method instead of an HPLC-MS method, greatly reducing the inspection cost and lowering the technical threshold.

For samples that must be verified by HPLC-MS, a method to increase the concentration of the target compound is provided so that various brands and models of mass spectrometers can meet the determination requirements.

There is no high-temperature link in the treatment process, and the treatment time is short, which avoids the possibility of Ranitidine being degraded into NDMA.

DETAILED DESCRIPTION OF THE EMBODIMENTS

Figure 1:
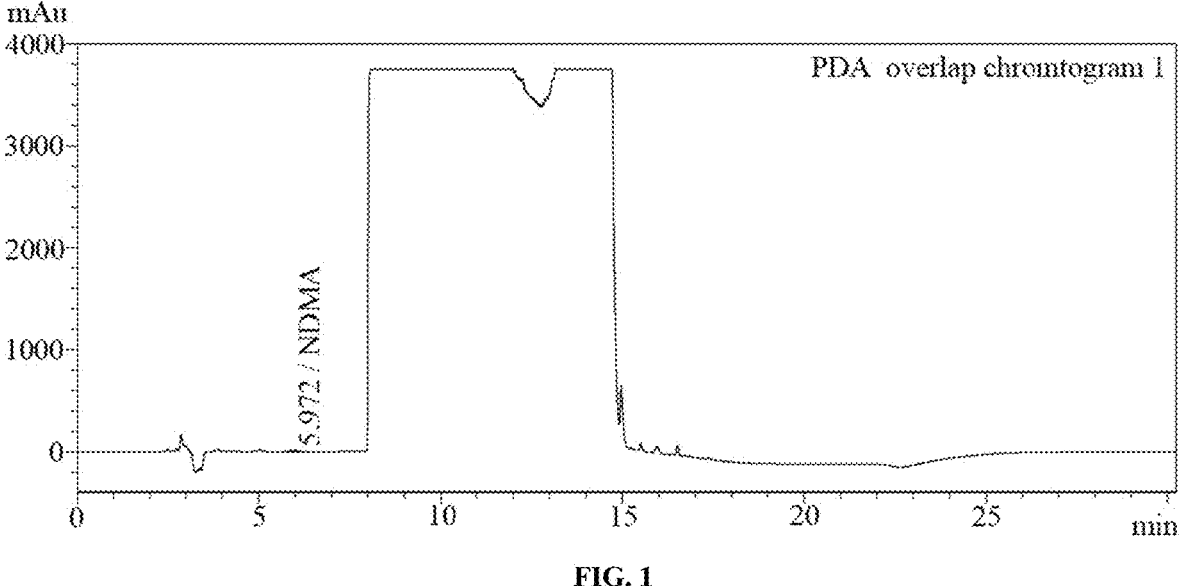
FIG. 1 is a spectrum of a sample detected by using an existing HPLC method (test solution concentration was 30 mg/ml).

Required materials: sample of Ranitidine hydrochloride capsules (source: Shanghai Huiren (Xiayi) Pharmaceutical Co., Ltd., Foshan ChiralPharm Co., Ltd., Suzhou HomeSun Pharmaceutical Co., Ltd., Bengbu BBCATushan Pharmaceutical Co., Ltd., Shanghai Hengshan Pharmaceutical Co., Ltd. Industry Co., Ltd., Yunpeng Pharmaceutical Group Co., Ltd.; strength were 150 mg; excipients were starch, magnesium stearate, etc.), silver nitrate reagent (analytical grade), sodium hydroxide reagent (analytical grade), sodium chloride reagent (analytical grade), purified water, centrifuge, centrifuge tube, and microporous membrane.

Basic Principles 2.1 According to the principle that the higher the concentration of the test solution, the higher the concentration of the analyte, the concentration of the test solution was increased from 30 mg/ml for the existing method to 250 mg/ml (the concentration of Ranitidine hydrochloride), and the concentration of the test solution was increased by 8 times so that the concentration of NDMA substantially met the requirement for quantification.

2.2 According to the principle that NDMA is stable in alkaline solution and Ranitidine is easy to degrade in acid to form NDMA, 0.35 g/ml of sodium hydroxide solution was added to the test solution to neutralize the chloride ions in Ranitidine hydrochloride, making it less soluble and easier to precipitate, while avoiding the degradation of Ranitidine to generate NDMA.

One molecule of Ranitidine hydrochloride contains one molecule of hydrochloric acid, and the same molar amount of sodium hydroxide is needed to neutralize chlorine ions. When the sampling amount of Ranitidine hydrochloride is 1.5 g, the same mole of sodium hydroxide is 0.17 g, and 0.5 ml of 0.34 g/ml sodium hydroxide solution may be added. In order to ensure complete neutralization of the chloride ions in Ranitidine hydrochloride, the concentration of sodium hydroxide solution was increased to 0.35 g/ml so that sodium hydroxide was slightly excess.

After research, it is advisable to add sodium hydroxide in an amount slightly more than the neutralization amount. On the one hand, the chlorine ion in Ranitidine hydrochloride is a strong acid, if there are not neutralized or not completely neutralized, they will exceed the buffer capacity of the mobile phase. The ionic state and molecular state of Ranitidine coexist, and the retention time of ionic Ranitidine advances, which will cause interference with NDMA, and the main peak splits. On the other hand, the amount of sodium hydroxide added should not be too large. If the addition amount far exceeds the neutralization amount, the alkalinity of the solution will exceed the stability limit of Ranitidine, causing Ranitidine to decompose into non-NDMA impurities.

2.3 According to the principle of silver ion complexation, there are 2 secondary amino groups in the structure of Ranitidine hydrochloride, which can be complexed with silver ions to form precipitates. To the test solution, a slight excess of silver nitrate was added at the molar ratio of 1:2 of Ranitidine hydrochloride to silver nitrate to induce precipitation.

Calculated based on the molar ratio 1:2 of Ranitidine hydrochloride to silver nitrate, when the sampling amount of Ranitidine hydrochloride was 1.5 g, the amount of silver nitrate added should be 1.45 g, rounded up to 1.5 g, so that there was a slight excess of 0.05 g of silver nitrate in the sample.

According to the physical and chemical properties of Ranitidine hydrochloride, methods such as alkali solution precipitation, water-soluble alcohol precipitation, isopropanol and acetone dissolution, and precipitation with different precipitants were explored. The results showed that: (1) after adding Ranitidine hydrochloride the a saturated aqueous solution of sodium hydroxide, a large amount of precipitates appeared, but Ranitidine was partially decomposed, and the filtrate still contained a large amount of Ranitidine, resulting in overloading of the chromatographic column; (2) Solvents such as methanol, ethanol, isopropanol, etc. were added to the Ranitidine aqueous solution, and a large amount of precipitation occurred, Ranitidine, but the amount of Ranitidine in the filtrate still exceeded the loading capacity of the chromatographic column; (3) the solubility of Ranitidine in solvents such as isopropanol and acetone was greatly reduced compared to that in water, resulting in a solution concentration that could not meet the limit requirement; (4) in term of the molecular structure, the precipitation method with barium salt as the precipitate was explored, which could not effectively precipitate Ranitidine; (5) Because Ranitidine is easily decomposed to generate NDMA after heating, all methods for treatment of test article that include heating steps cannot be used; (6) Ranitidine hydrochloride is similar to NDMA in nature, both of them are readily soluble in water, and the amino groups that are contained are all alkaline, therefore they cannot be effectively separated by using solid-liquid extraction, liquid-liquid extraction, SPF small column adsorption, and other methods; (7) NDMA is a trace substance in Ranitidine hydrochloride, and only a separation method with a high specificity can produce a satisfactory separation effect. To sum up, at present, only the method of the neutralization of sodium hydroxide and the method of the selective complexation of silver nitrate with Ranitidine are indispensably combined, achieving high precipitation efficiency, and silver nitrate does not react with NDMA, can we obtain the best treatment method for precipitation of Ranitidine hydrochloride test article.

After analyzing the structure of Ranitidine, it was found that no other active groups that could be utilized by the precipitation reagent had been found, except for the silver ion complexing secondary amine group. In addition to the use of precipitation reagents, the chlorine ions of Ranitidine can be removed by alkalization of the solution, so that the solubility of Ranitidine decreases, and high-concentration Ranitidine precipitates in aqueous solution or methanol solution. However, after repeated tests, the precipitation rate of this method was not high, and Ranitidine remaining in the solution still seriously exceeds the chromatographic column load capacity.

In addition, gas chromatography was used, and a high-concentration test solution could be used in the headspace sampling method, and the NDMA concentration could meet the requirement for inspection. However, after research, the headspace sampling mode requires heating and shaking and long equilibration time, which leads to the decomposition of Ranitidine in the headspace injector, resulting in bigger test results or false positivity.

2.4 Based on the principle that precipitation occurs when silver ions react with chloride ions, an appropriate amount of sodium chloride was added to the test solution containing excess silver nitrate to precipitate the excess silver nitrate to protect the instrument and chromatographic column in the subsequent measurement process.

2.5 Based on the physical and chemical properties of NDMA, NDMA has good water solubility, is more stable in alkaline solution, does not react with other added reagents such as silver nitrate, and can be well separated from Ranitidine by precipitation.

Example 1

An appropriate amount of Ranitidine or its solid preparation (containing about 1.5 g of Ranitidine), 2.5 ml of water was precisely added and subjected to ultrasonication for 2 minutes for dissolution. 0.5 ml of 0.35 g/ml sodium hydroxide solution was precisely added and shaken well, and 2 ml of 1 g/ml silver nitrate solution was precisely added and shaken well. 1 ml of 0.2 g/ml sodium chloride solution was precisely added and shaken well. The resulting solution was allowed to stand for 10 minutes, centrifuged, and filtered to obtain a filtrate. The filtrate should be clear and colorless. If it was turbid, it was feasible to be frozen at −20° C. for 10 minutes, then centrifuged and filtered.

After repeated verification, under the above-set and proposed operation, the precipitation of Ranitidine hydrochloride was almost completely precipitated, and the test solution could change from a light yellow viscous liquid before precipitation to a clear and non-viscous state. Each test batch of filtrate did not appear turbid after adding sodium chloride solution dropwise, indicating that the silver ion was completely removed. After more than 50 injections, the performance of the chromatographic column did not decrease significantly, indicating that the treated test solution did not cause dramatic loss to the chromatographic system.

Using the method in the liquid phase section of the existing methods, samples were measured according to a method following the pretreatment method of the present disclosure, and NDMA could be detected. However, due to the limitation that ordinary liquid chromatography could not screen out compounds having target molecular weights through an MS detector, the resolution was not ideal, therefore the existing method can only be used for preliminary screening.

In order to achieve desired separation of liquid chromatography, the liquid chromatography conditions were optimized as follows: an measurement method: HPLC; octadecylsilane bonded silica gel as packing material, and 10 mM ammonium bicarbonate as mobile phase A (ammonia was used to adjust pH to 10.0), acetonitrile as mobile phase B. Gradient elution was conducted according to the table below. For UV detector detection, the wavelength was 235 nm, the flow rate was 1 ml/min, the column temperature was 30° C., and the sample injection volume was 20 μl. Under these chromatographic conditions, the retention time of NDMA was further prolonged. Through gradient elution, the main peak of Ranitidine appeared at the end of the second gradient (15-25 min), and the resolution between the adjacent impurity peak and NDMA reached above 1.5.

TABLE 1

| Time (min) | A % | B % |
|---|---|---|
| 0 | 95 | 5 |
| 15 | 95 | 5 |
| 25 | 20 | 80 |
| 40 | 20 | 80 |
| 40.1 | 95 | 5 |
| 55 | 95 | 5 |

According to this technique, the retention time of NDMA is about 6 minutes, the retention time of Ranitidine is about 25 minutes, and the limit of quantification of NDMA in Ranitidine was about 32 ppb, which had reached the same level of detection sensitivity in HPLC-MS.

Comparative Example 1

Current method: an appropriate amount of Ranitidine or its solid preparation was precisely added to water and ultrasonicated for 2 minutes to dissolve and a test solution was obtained. The concentration of the test solution was 30 mg/ml (containing 20 times the limit of NDMA). The test solution was determined using the method in the liquid chromatography section of Appendix 2: "Determination of N-nitrosodimethylamine in capsules tablets of raw material of Ranitidine hydrochloride by HPLC-MS/MS" of the Notice on Inspection of Nitrosodimethylamine "(Zhongjian Chemical Pharmaceutical Letter [2019] No. 710). As shown in FIG. 1, the chromatographic column is seriously overloaded and the chromatographic peaks are split. The peak of NDMA appeared at 4 min, and the leading edge of the main peak of Ranitidine led forward by about 8 min. The impurities of Ranitidine may interfere with the detection of NDMA.

Comparative Example 2

Figure 2:
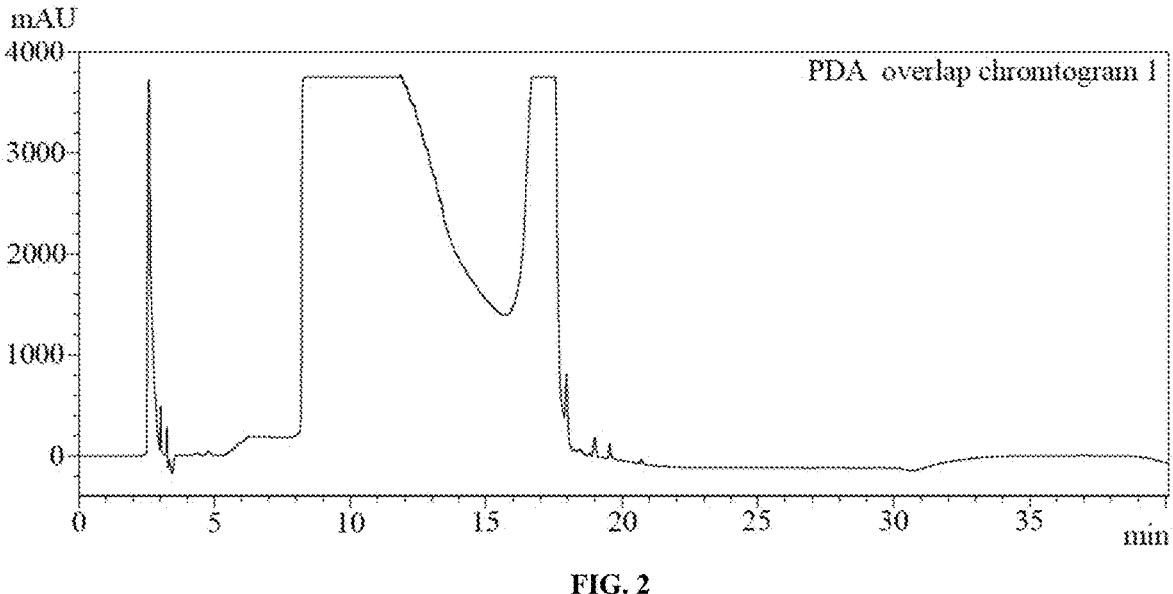
FIG. 2 is a spectrum of a sample detected after Ranitidine was precipitated with alkali (test solution concentration was 30 mg/ml).

The current method (addition of sodium hydroxide): To an appropriate amount of Ranitidine or its solid preparation was precisely added water, the resulting mixture was sonicated for 2 minutes for dissolution to obtain a test solution having a concentration of 30 mg/ml. To the test solution was added 0.5 ml of 0.35 g/ml sodium hydroxide, shaken well, and Ranitidine precipitated. The filtrate was sampled for measurement. As shown in FIG. 2, the chromatographic column was still seriously overloaded, and the chromatographic peaks were split.

Comparative Example 3

Figure 3:
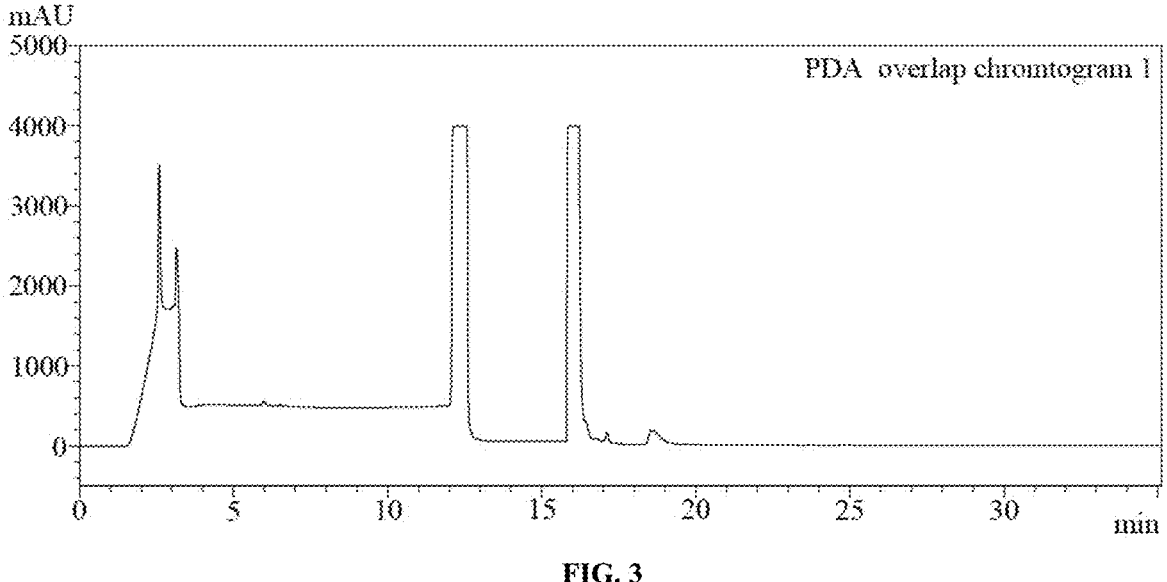
FIG. 3 is a spectrum of a sample detected after Ranitidine was precipitated with silver nitrate (test solution concentration was 250 mg/ml).

The main method of the present disclosure: To an appropriate amount of Ranitidine or its solid preparation was precisely added water, and the resulting mixture was sonicated for 2 minutes for dissolution to obtain a test solution having a concentration of 250 mg/ml. 2 ml of 1 g/ml silver nitrate solution was added to the test solution and shaken well. As shown in FIG. 3, the overload of the chromatographic column was greatly alleviated, but the acidic test article exceeded the buffer capacity of the mobile phase, resulting in the coexistence of Ranitidine and Ranitidine hydrochloride and double peaks appeared in the chromatographic spectrum.

Comparative Example 4

Figure 4:
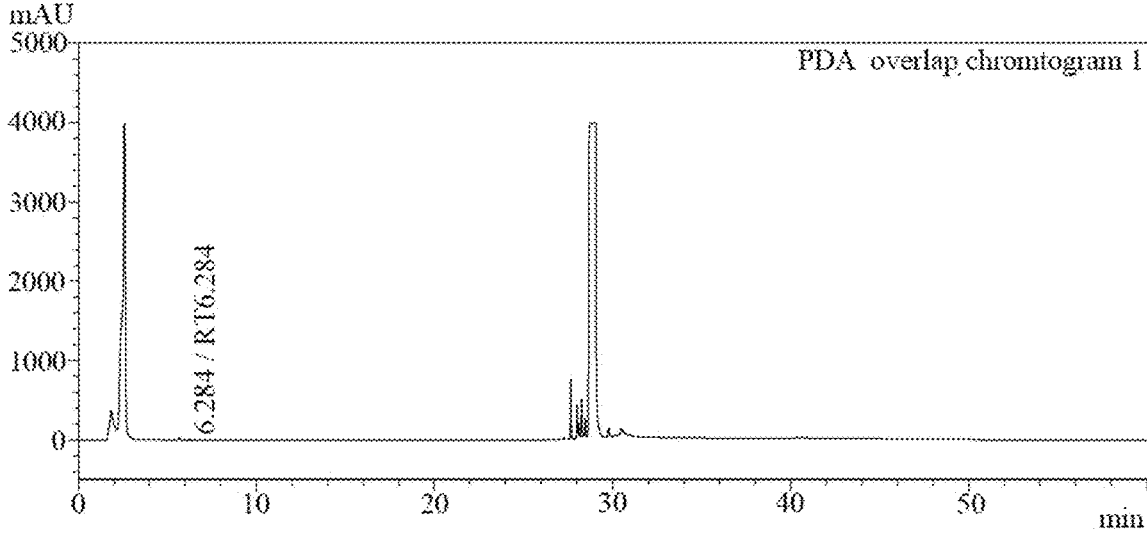
FIG. 4 is a spectrum of a sample detected after Ranitidine was precipitated with sodium hydroxide (test solution concentration was 250 mg/ml).
Figure 5:
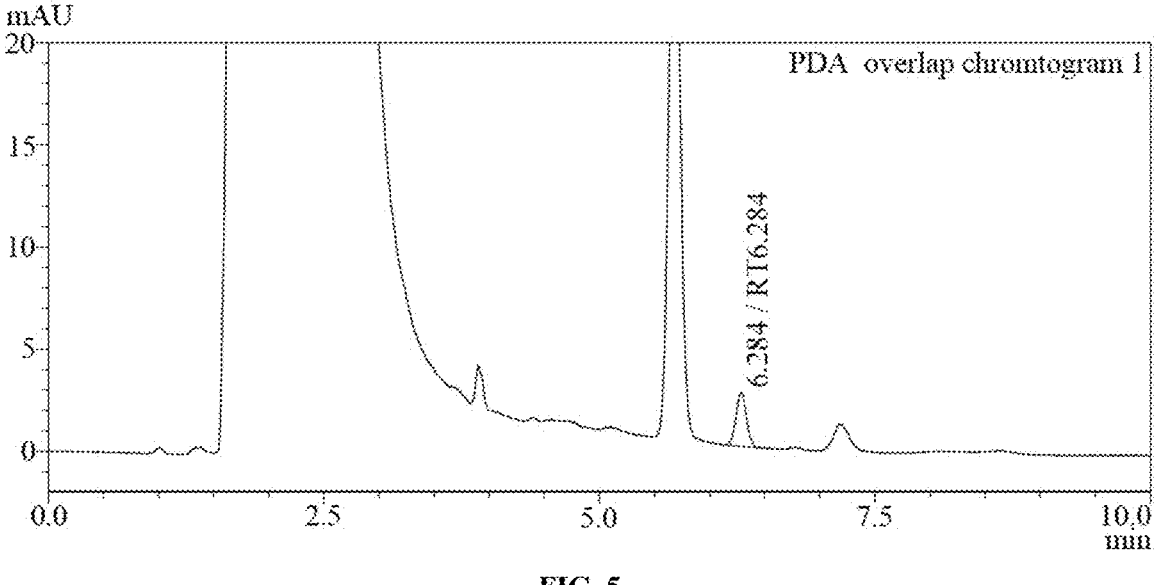
FIG. 5 is a partially enlarged view of FIG. 4.

Optimization of the method of the present disclosure: after neutralizing the chloride ions of Ranitidine hydrochloride with sodium hydroxide, the precipitation was more complete. As shown in FIG. 4, the overloading of the chromatographic column was further alleviated, and no double peaks of Ranitidine appeared. By adjusting the procedure of gradient elution, the peak of Ranitidine can appear at any time after 10 minutes. As shown in FIG. 5, NDMA is well separated from adjacent chromatographic peaks. Detection was conducted using a UV detector detection, with a wavelength of 235 nm, injection volume of 20 μl, and the limit of quantification of NDMA in Ranitidine was about 32 ppb.

Comparative Example 5

Figure 6:
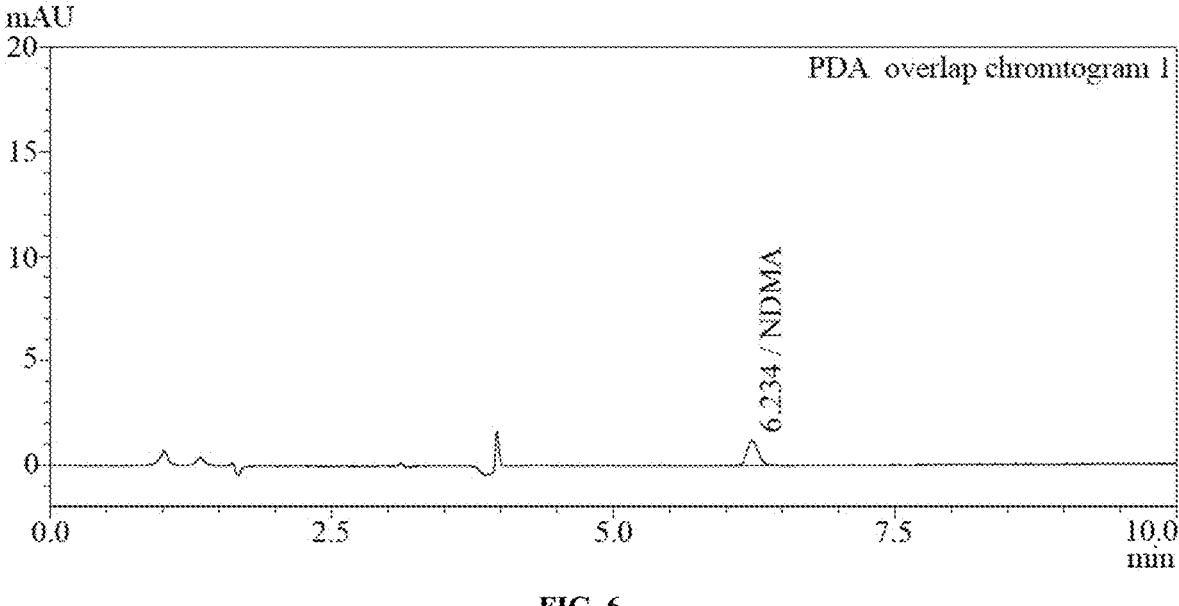
FIG. 6 is a spectrum of a reference substance at a limit concentration (73 ng/ml).

A reference substance of NDMA having a limit concentration (73 ng/ml) was prepared. As shown in FIG. 6, the reference substance (73 ng/ml) having a limit concentration had a good response, the detection limit could reach 32 ppb, and the sensitivity was slightly higher than that of mass spectrometry.

Comparative Example 6

Figure 7:
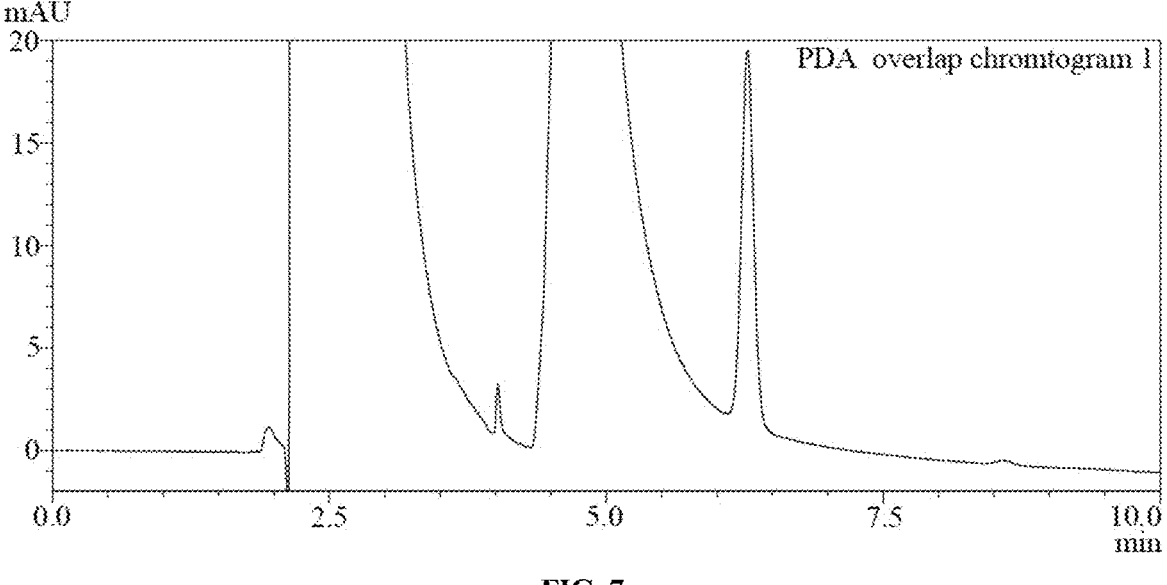
FIG. 7 is a spectrum of the new-batch active pharmaceutical ingredient of Ranitidine hydrochloride.

As shown in FIG. 7, the newly shipped active pharmaceutical ingredient of Ranitidine hydrochloride was collected and treated according to the method in Example 1 of the present disclosure, and no NDMA was detected. This indicated that the NDMA peak was not interfered by other impurities.

Example 2

Figure 8:
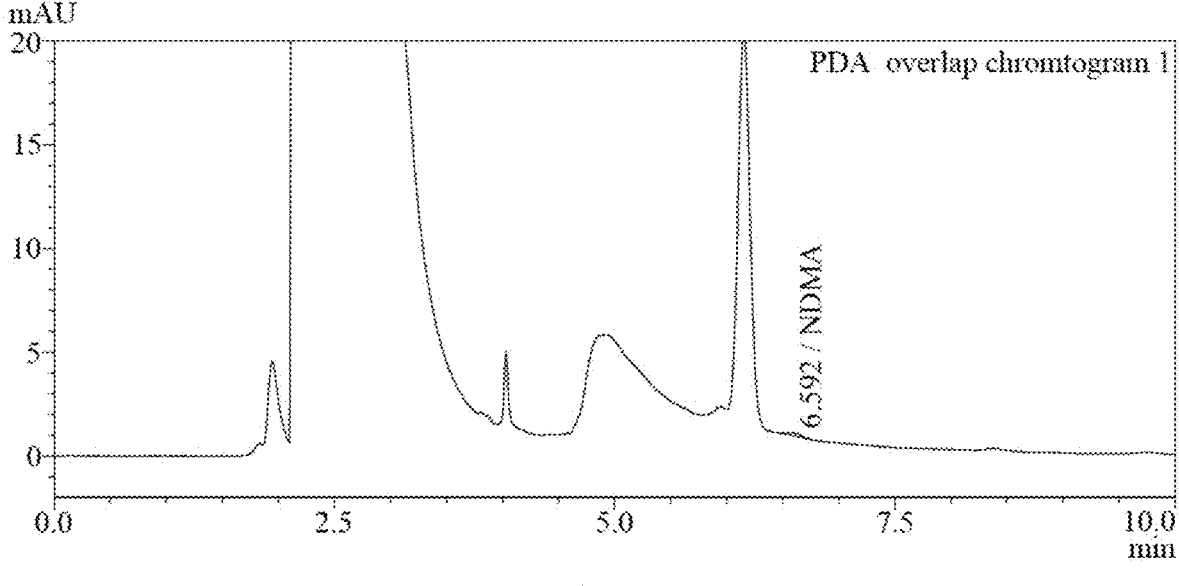
FIG. 8 is a spectrum of the new-batch Ranitidine hydrochloride capsules.

As shown in FIG. 8, the newly shipped Ranitidine hydrochloride capsules were collected and treated according to the method in Example 1 of the present disclosure, and detected amount of NDMA was below the limit, and the assay results were consistent with the detection results by current MS methods, which again showed that the method of the present disclosure had an NDMA detection capability that reached the level of mass spectrometry.

Example 3

Figure 9:
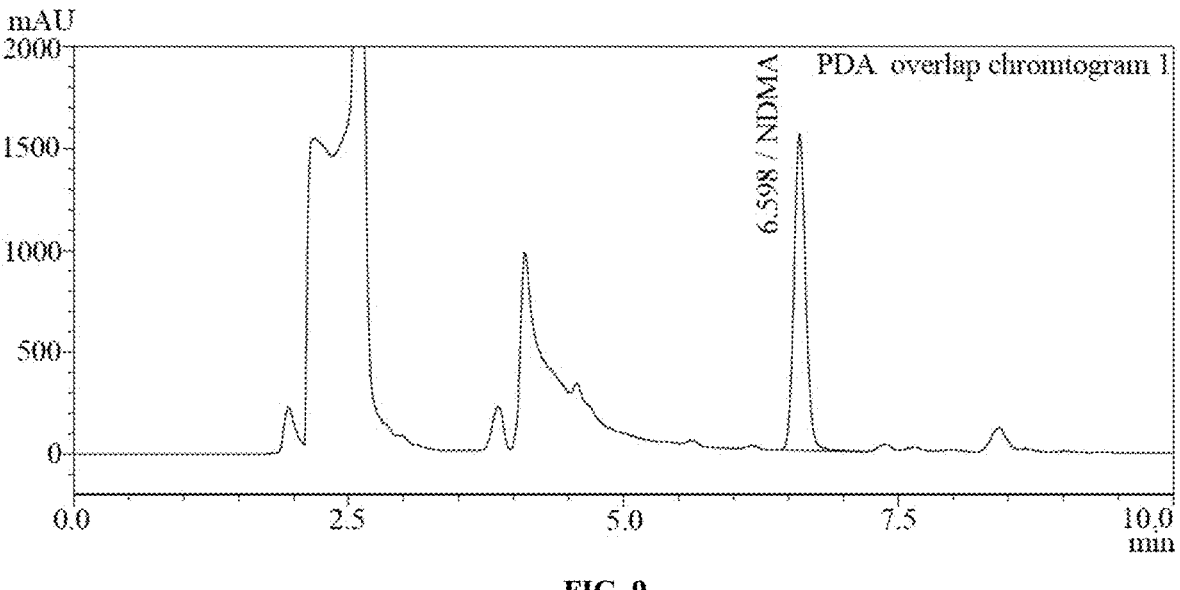
FIG. 9 is a spectrum of new-batch Ranitidine hydrochloride capsules placed at a high temperature of 80° C.

The newly shipped Ranitidine hydrochloride capsules of the same batch were placed at 80° C. for 6 hours. As shown in FIG. 9, after being treated according to the method of the present disclosure, NDMA of 1000 times the detection limit was detected. It is shown that the method had good specificity and high sensitivity. At the same time, it is also shown that there was a very apparent tendency for Ranitidine to degrade and produce NDMA in a high-temperature environment.

Example 4

Figure 10:
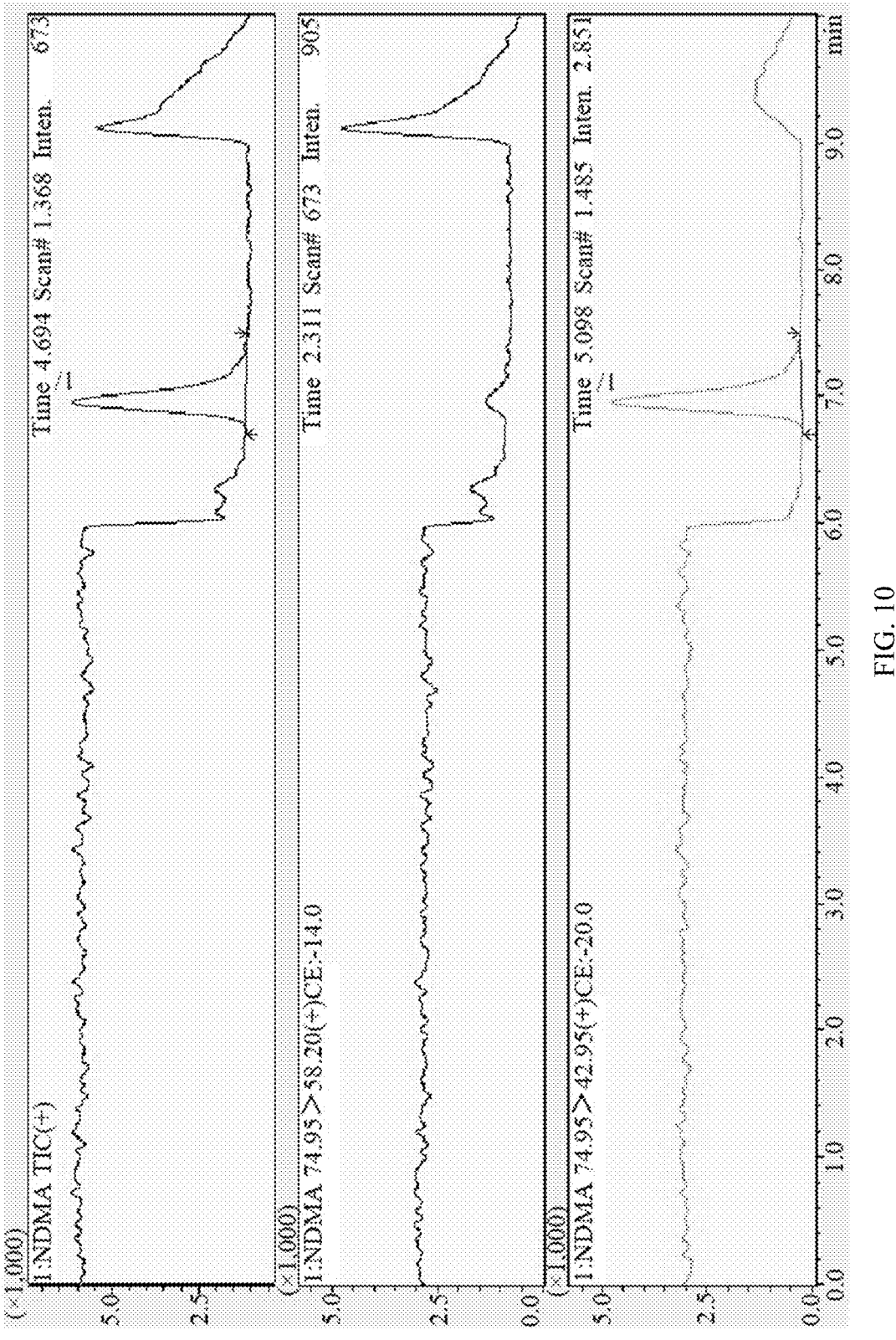
FIG. 10 is the mass spectrogram of the sample prepared according to pretreatment method of the present disclosure (material purchased from Yunpeng Pharmaceutical Group, containing NDMA of a limit amount)

As shown in FIG. 10, the mass spectrum of the sample (Yunpeng Pharmaceutical Group, containing NDMA of about a limit amount) was generated according to the pretreatment method of the present disclosure. An MS detector (triple quadrupole, APCI source, positive ion scanning mode, multiple reaction monitoring, and collision voltage 12V) was used for detection, injection volume was 2 μl, the response of NDMA in Ranitidine was greatly enhanced.

Figure 11:
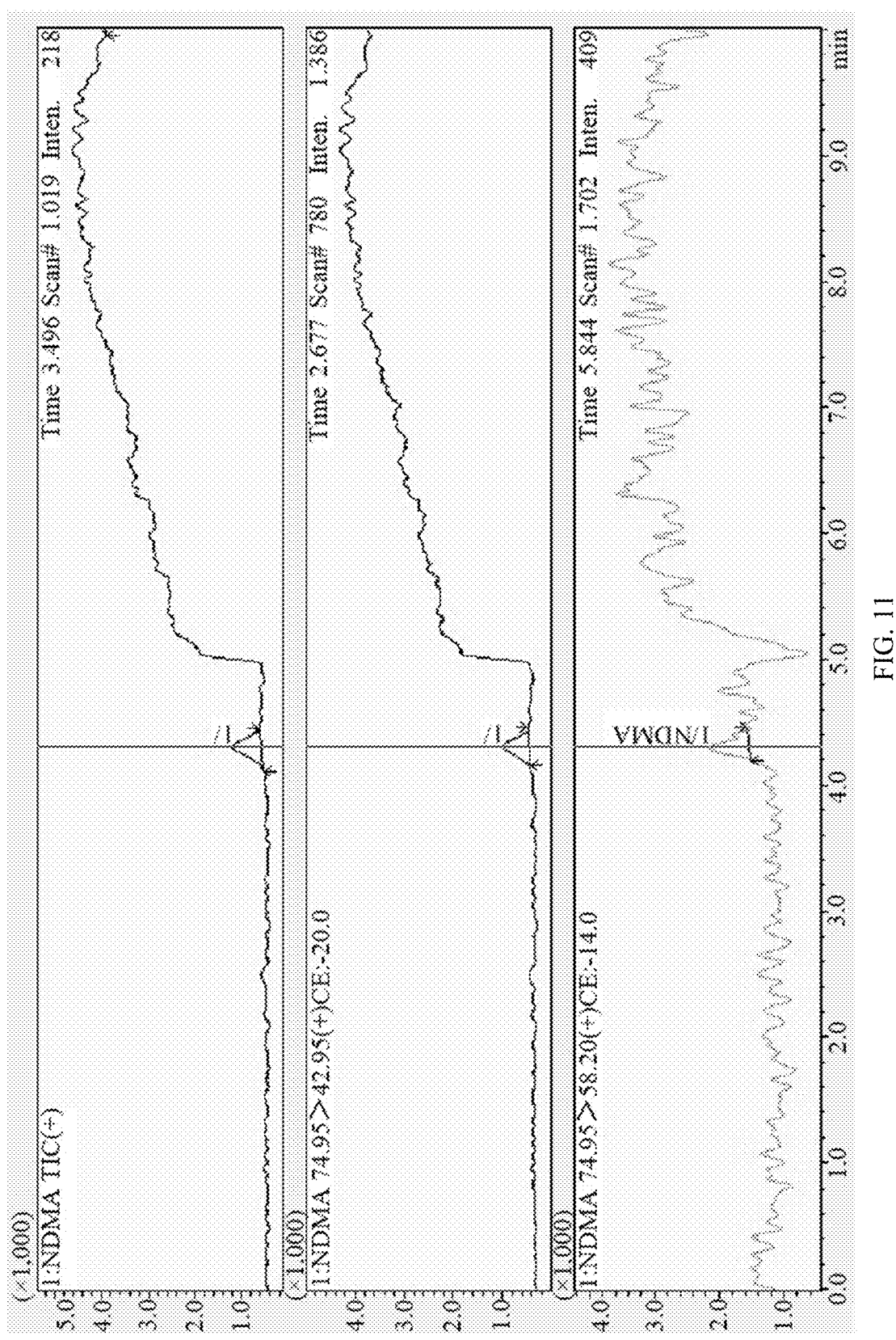
FIG. 11 is the mass spectrogram of the sample prepared according to the existing method (material purchased from Yunpeng Pharmaceutical Group, containing NDMA of a limit amount).

As shown in FIG. 11, the mass spectrum of the sample was prepared according to the current method (Yunpeng Pharmaceutical Group, containing NDMA of a limit amount). An MS detector (triple quadrupole, APCI source, positive ion scanning mode, multiple reaction monitoring, and collision voltage 12V) was used for detection, the injection volume was 2 μl, and the sensitivity for NDMA in Ranitidine was about 15% of that in the method of the present disclosure.

Figure 12:
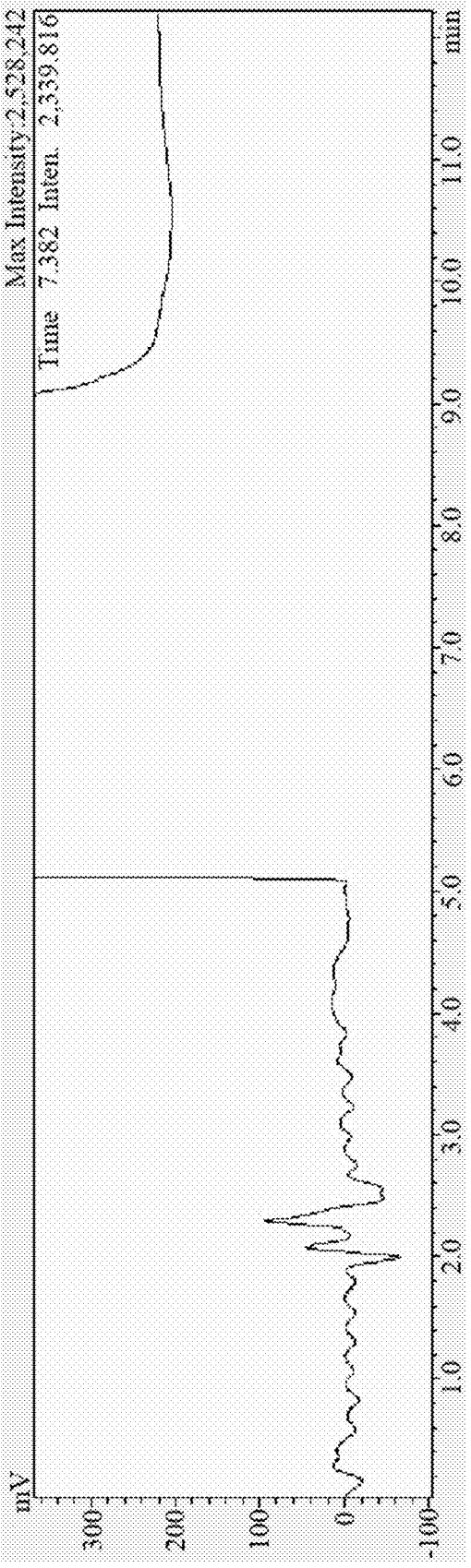
FIG. 12 is a spectrum of a sample detected according to the LC section of the existing method (material purchased from Yunpeng Pharmaceutical Group, containing NDMA of a limit amount).
Figure 13:
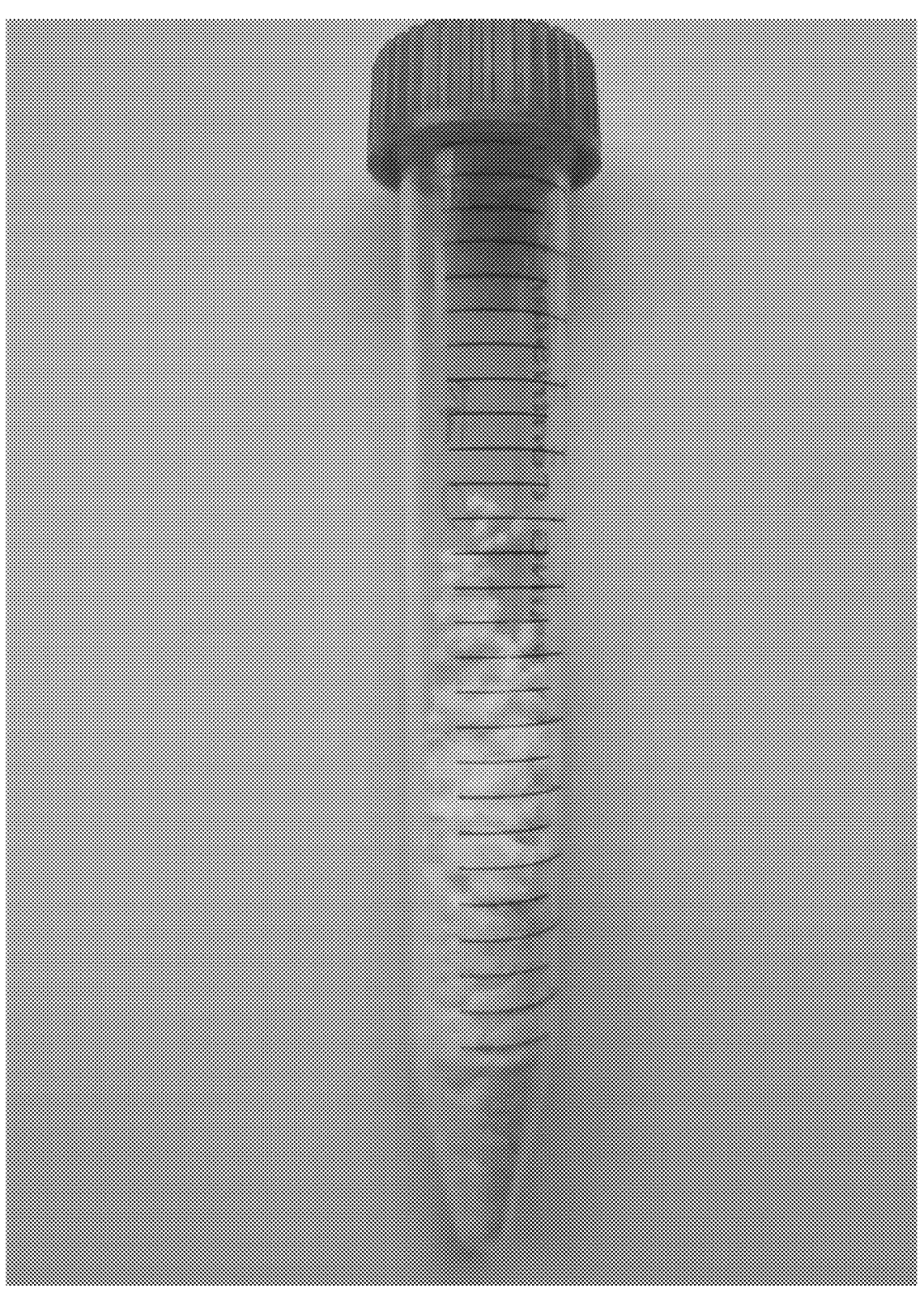
FIG. 13 is a spectrum of a sample of test article (the active pharmaceutical ingredient of Ranitidine hydrochloride, 1.5 g).
Figure 14:
FIG. 14 shows the dissolution by precisely adding 2.5 ml of water.
Figure 15:
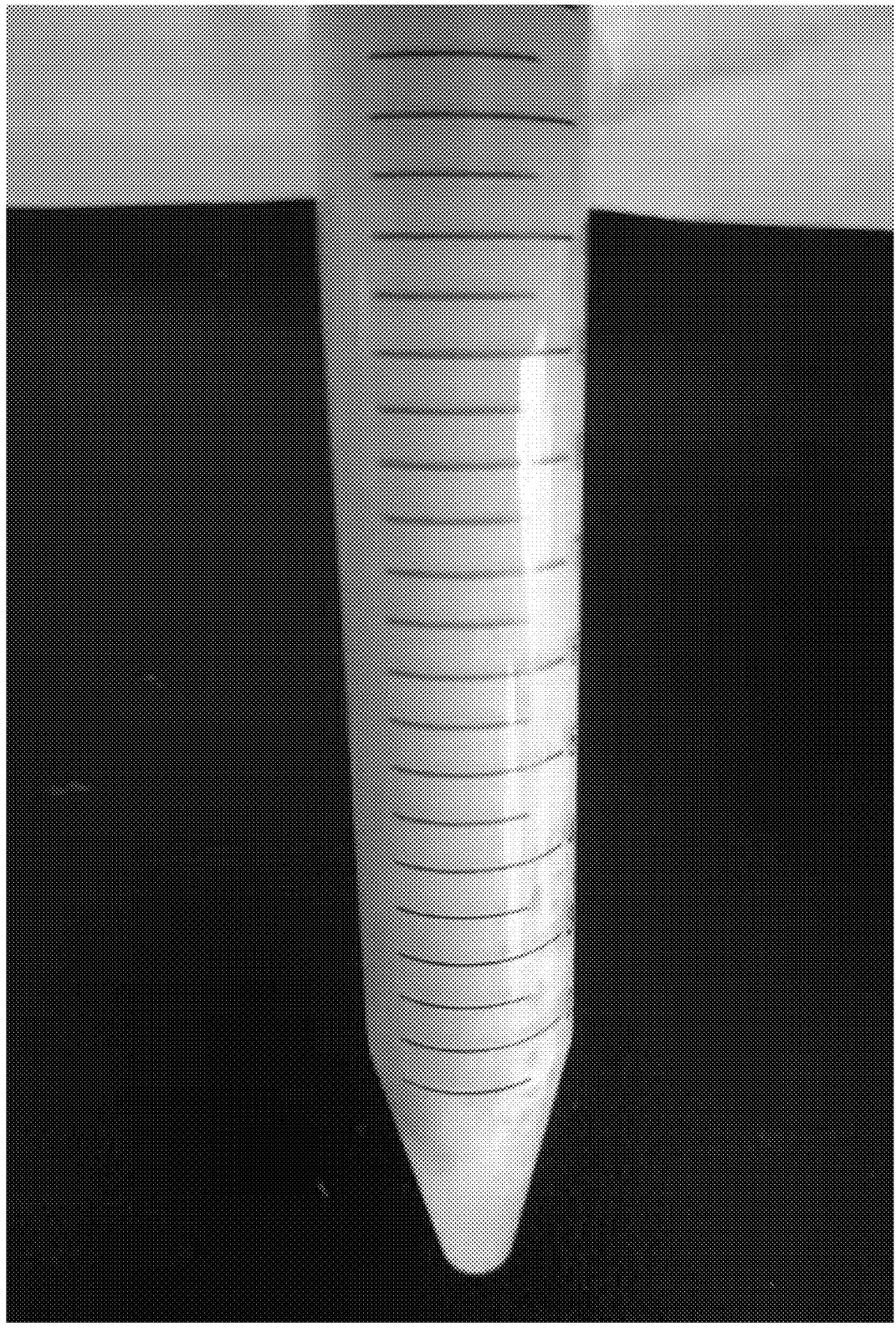
FIG. 15 shows that respective reagents had been added and shaken well.
Figure 16:
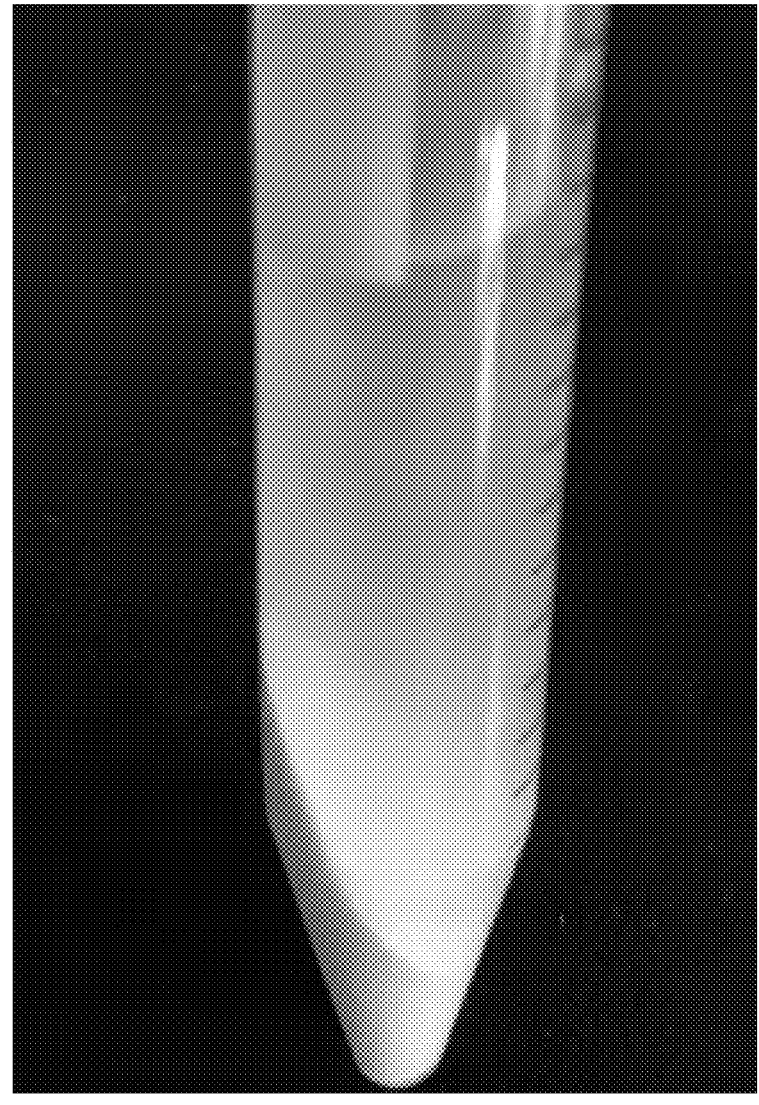
FIG. 16 shows the test solution after centrifugation.

As shown in FIG. 12, the liquid chromatographic spectrum was determined according to the existing method (Yunpeng Pharmaceutical Group, containing NDMA of a limit amount). An ultraviolet detector was used for detection, the injection volume was 20 μl, and NDMA was not detected because the sensitivity was too low.

What is claimed is:
1. A method for pretreating a sample of Ranitidine hydrochloride, comprising the following steps:
    step S1: weighing a Ranitidine hydrochloride sample containing an impurity of N-nitrosodimethylamine;
    step S2: preparing a Ranitidine hydrochloride test solution, such that a concentration of N-nitrosodimethylamine in the Ranitidine hydrochloride test solution is higher than a detection limit of a high-performance liquid chromatographic method for detecting the Ranitidine hydrochloride test solution;
    step S3: adding an alkaline solution to the Ranitidine hydrochloride test solution to allow the alkaline to react completely with chloride ions in Ranitidine hydrochloride to obtain a Ranitidine neutralizing solution;

step S4: adding a silver ion solution to the Ranitidine neutralizing solution to obtain a reaction solution; wherein silver ions in the reaction solution undergo a complexation reaction with a secondary amino group in the Ranitidine completely to generate a precipitate; and step S5: filtering a resulting reaction solution formed in S4 to obtain filtrate as a processed test solution.

2. The method according to claim 1, wherein in step S3, a molar ratio of the Ranitidine hydrochloride test solution to the alkaline solution is 1:(1-1.05).

3. The method according to claim 1, wherein in step S4, a molar ratio of the Ranitidine neutralizing solution to the silver ion solution is 1:(2-2.1).

4. The method according to claim 1, wherein step S5, if the filtrate is turbid, the filtrate is frozen at −25 to −15° C. for 5 to 20 minutes, then centrifuged and filtered to obtain the treated test solution.

5. The method according to claim 1, wherein in step S4, if excess of silver ion solution is added, then a chloride ion solution is added to the reaction solution after the precipitation in step S4 to react with excess silver ion to produce a precipitate.

6. The method according to claim 5, wherein a molar ratio of the chloride ion solution to the silver ion solution is (0.5-0.6):(2-2.1).

7. The method according to claim 1, wherein the alkaline solution is selected from sodium hydroxide aqueous solution, potassium hydroxide aqueous solution, sodium carbonate aqueous solution, sodium bicarbonate aqueous solution, and ammonia.

8. The method according to claim 1, wherein the silver ion solution is silver nitrate solution.

9. The method according to claim 1, wherein the Ranitidine hydrochloride test solution is an aqueous solution of a Ranitidine hydrochloride test article.

10. The method according to claim 1, wherein an injection volume for the high-performance liquid chromatographic method is 20 µL.

11. The method according to claim 2, wherein in step S4, if excess of silver ion solution is added, then a chloride ion solution is added to the reaction solution after the precipitation in step S4 to react with excess silver ion to produce a precipitate.

12. The method according to claim 3, wherein in step S4, if excess of silver ion solution is added, then a chloride ion solution is added to the reaction solution after the precipitation in step S4 to react with excess silver ion to produce a precipitate.

13. The method according to claim 4, wherein in step S4, if excess of silver ion solution is added, then a chloride ion solution is added to the reaction solution after the precipitation in step S4 to react with excess silver ion to produce a precipitate.

14. The method according to claim 2, wherein the alkaline solution is selected from sodium hydroxide aqueous solution, potassium hydroxide aqueous solution, sodium carbonate aqueous solution, sodium bicarbonate aqueous solution, and ammonia.

15. The method according to claim 3, wherein the alkaline solution is selected from sodium hydroxide aqueous solution, potassium hydroxide aqueous solution, sodium carbonate aqueous solution, sodium bicarbonate aqueous solution, and ammonia.

16. The method according to claim 4, wherein the alkaline solution is selected from sodium hydroxide aqueous solution, potassium hydroxide aqueous solution, sodium carbonate aqueous solution, sodium bicarbonate aqueous solution, and ammonia.

17. The method according to claim 2, wherein the silver ion solution is silver nitrate solution.

18. The method according to claim 3, wherein the silver ion solution is silver nitrate solution.

19. The method according to claim 4, wherein the silver ion solution is silver nitrate solution.

20. The method according to claim 2, wherein the Ranitidine hydrochloride test solution is an aqueous solution of a Ranitidine hydrochloride test article.

* * * * *